United States Patent [19]

Grinaski et al.

[11] Patent Number: 5,090,516
[45] Date of Patent: Feb. 25, 1992

[54] ELEVATOR LINEAR MOTOR BUS BAR

[75] Inventors: Timothy J. Grinaski, East Hartford; Jerome E. Jaminet, Glastonbury; Eric G. Olsen, Woodbury, all of Conn.

[73] Assignee: Otis Elevator Company, Farm Springs, N.J.

[21] Appl. No.: 670,746

[22] Filed: Mar. 15, 1991

[51] Int. Cl.$^5$ .............................. B66E 1/34
[52] U.S. Cl. .................... 187/112; 187/122; 187/135
[58] Field of Search ............ 187/112, 122, 136; 104/290, 293; 310/12

[56] References Cited

U.S. PATENT DOCUMENTS

| | | | |
|---|---|---|---|
| 3,612,395 | 10/1971 | English | 238/122 |
| 3,641,939 | 2/1972 | Remy et al. | 104/293 |
| 3,667,397 | 6/1972 | Haynes | 104/294 |
| 3,667,398 | 6/1972 | English | 104/294 |
| 3,837,032 | 9/1974 | Ulbrich | 15/250.17 |
| 4,051,398 | 9/1977 | Kondo | 310/12 |
| 4,068,152 | 1/1978 | Nakamura | 318/135 |
| 4,402,386 | 9/1983 | Ficheux et al. | 187/112 |
| 4,454,457 | 6/1984 | Nakamura | 318/135 |
| 4,570,753 | 2/1986 | Ohta | 187/1 R |
| 4,694,209 | 9/1987 | Shindou | 310/12 |
| 4,993,327 | 2/1991 | Labarre et al. | 104/290 |

FOREIGN PATENT DOCUMENTS 2655780 6/1988 Fed. Rep. of Germany .

Primary Examiner—A. D. Pellinen
Assistant Examiner—Lawrence E. Colbert
Attorney, Agent, or Firm—Lloyd D. Doigan

[57] ABSTRACT

An elevator is driven by a linear motor having a flat secondary element comprised of a plurality of segments which extend the length of an elevator rise. The segments of the secondary element are connected by a bus bar which overlaps joints between each adjacent segment by enclosing an end portion of each segment. The bus bar, conducts current across the joints, provides a surface for guide rollers which maintain an air gap between the secondary element and a primary element, and minimizes relative motion between adjacent segments of the secondary element.

10 Claims, 4 Drawing Sheets

1

ELEVATOR LINEAR MOTOR BUS BAR

TECHNICAL FIELD

This invention relates to elevators, and more particularly to an elevator utilizing a linear motor having a plurality of segmented, flat secondary elements connected by a bus bar.

BACKGROUND OF THE INVENTION

A traction elevator car is supported by a wire rope which is attached at a first end to an elevator car and at a second end to a counterweight. The rope passes over a sheave which is driven by an electric motor. The motor raises or lowers the elevator car by traction forces generated between the wire rope and the sheave.

Usually, the drive sheave and electric motor are arranged above the elevator car in a machine room. In buildings, where space is at a premium, machine rooms are not desirable.

Hydraulic elevators are driven by a piston. The piston is usually disposed within a pit beneath the car, thereby obviating the need for a machine room. Building the pit and maintaining the piston therein is relatively time consuming and expensive, however. Hydraulic elevators have other drawbacks relative to traction elevators: the rise of the car is limited by the length of the piston; the speed of travel is inferior; and the weight of the car is not offset by a counterweight and therefore, hydraulic elevators utilize far more energy.

In U.S. Pat. No. 4,402,386 to Ficheux et al entitled "SELF-POWERED ELEVATOR USING A LINEAR ELECTRIC MOTOR AS COUNTERWEIGHT" and owned by the assignee herein, an elevator is shown that is driven by linear motor comprised of a tubular primary element disposed around a tubular secondary element. The linear motor does not require a machine room, as required by a traction elevator, and has no pit, as required by an hydraulic elevator. The linear motor is also energy efficient and fast relative to an hydraulic elevator. However, it has been found, to date, that it is impractical to hang a tubular secondary element over a given number of stories, thereby limiting the rise of the elevator.

DISCLOSURE OF THE INVENTION

It is an object of the invention to provide an elevator which utilizes a linear motor which has a relatively high rise.

It is a further object of the invention to provide an elevator having a relatively high efficiency.

According to the invention, an elevator is driven by a linear motor having a flat secondary element comprised of a plurality of segments which extend the length of an elevator rise. The segments of the secondary element are connected by a bus bar which overlaps joints between each adjacent segment.

According to a feature of the invention, the bus bar encloses an end portion of each element.

The bus bar has several advantages as follows: the bus bar provides an electrically conductive path between adjacent segments of the secondary; the bus bar provides a guide surface for rollers which maintain an air gap between the secondary element and one or more primary elements; and, the bus bar minimizes relative motion between adjacent segments to ensure that the air gap is maintained.

These and other objects, features, and advantages of the present invention will become more apparent in light of the following detailed description of a best mode embodiment thereof, as illustrated in the accompanying drawing.

BEST MODE FOR CARRYING OUT THE INVENTION

Figure 1:
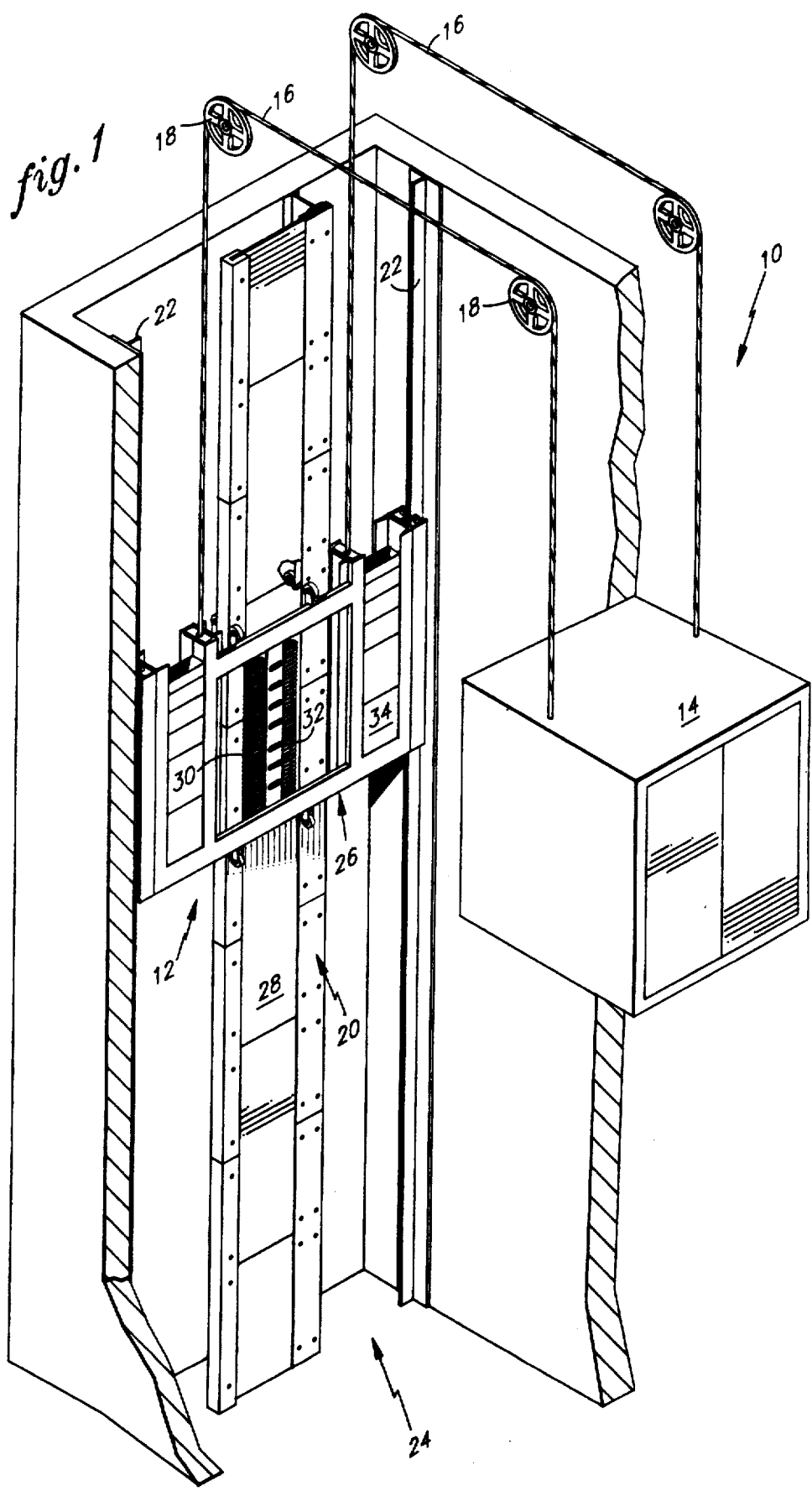
FIG. 1 is a perspective view partially broken away of an elevator driven by a flat linear motor of the invention.

Referring to FIG. 1, an elevator 10 employing an embodiment of a flat linear motor 12 of the invention is shown. The elevator consists of a car 14, ropes 16, idler sheaves 18, flat linear motor 12, a secondary support 20, and a pair of T-shaped guide rails 22 which extend the length of the elevator rise in the hoistway 24. The ropes attach at a first end thereof to the car, extend over the idler sheaves, and attach at a second end thereof to the flat linear motor.

The Linear Motor

Figure 2:
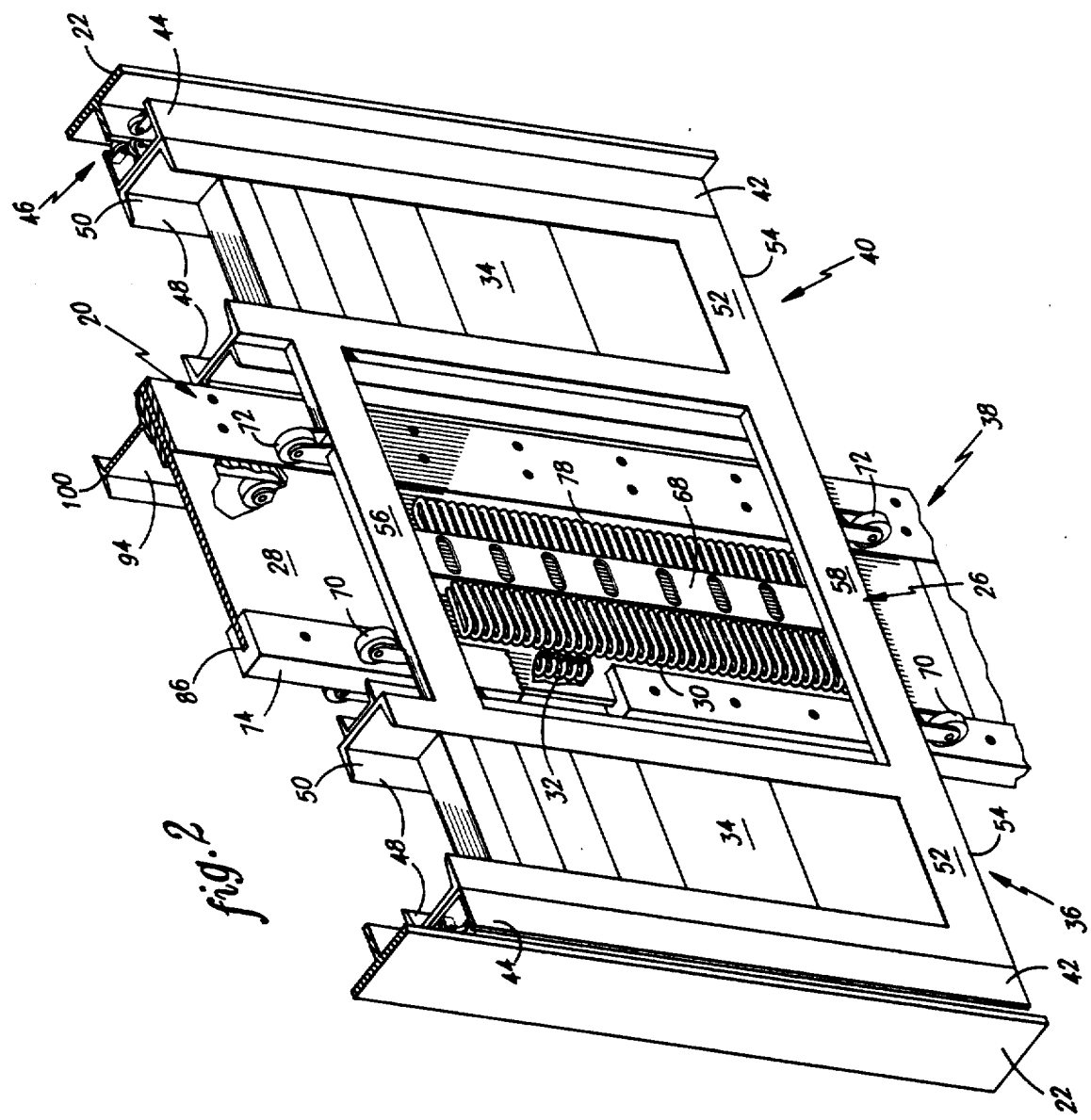
FIG. 2 is a front view in perspective and partially broken away of the flat linear motor of FIG. 1.
Figure 3:
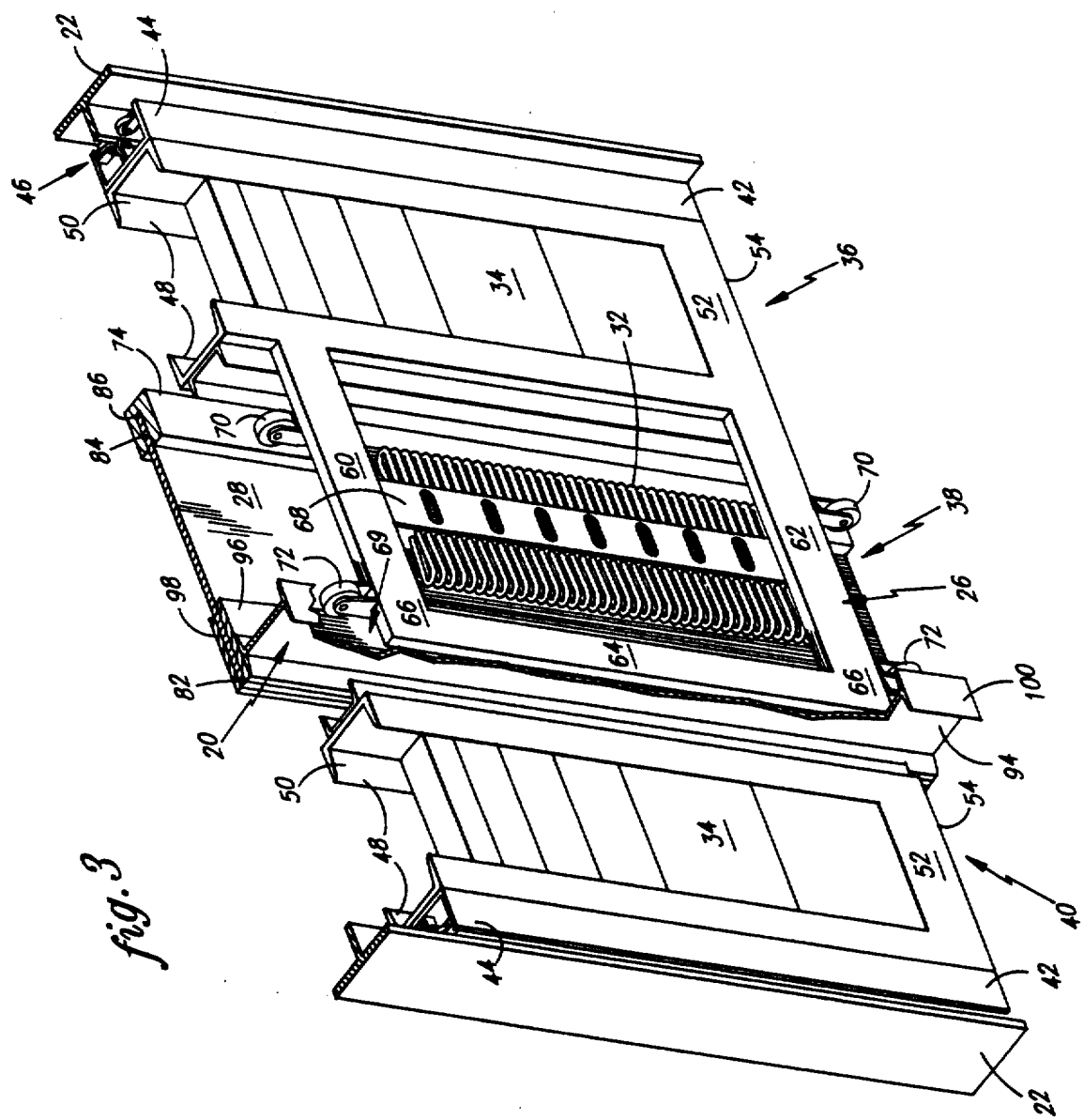
FIG. 3 is a back view in perspective and partially broken away of the flat linear motor of FIG. 1.

Referring to FIGS. 2 and 3, the linear motor is comprised of a housing 26, a secondary element 28, a first primary element 30, a second primary element 32, and counterweights 34.

The Housing

The housing 26, which is constructed of structural steel, or the like, has: at one end portion thereof, a first counterweight assembly 36; at a median portion thereof, a primary assembly 38; and at a second end portion thereof, a second counterweight assembly 40.

A guide assembly 42, which guides the housing up and down the hoistway 24, is attached to each of the counterweight assemblies 36, 40. Each guide assembly is comprised of a channel 44 having a U-shaped cross section. The channel also has, disposed at upper and lower portions thereof, a set of three guide rollers 46, as are known in the art, for engaging the T-shaped guide rail 22.

Each counterweight assembly 36, 40 is comprised of: a pair of opposed channel sections 48 having a U-shaped cross-section, each channel section having an open portion 50, each open portion facing the other open portion of the other channel section so that a lead weight (or the like) may be received and retained between the sections; and a base portion 52 having a U-shaped cross-section (not shown) which connects the channel sections 48 for retaining the weights within a bottom portion 54 of each counterweight assembly.

The primary assembly 38 is comprised of: a first upper cross-piece 56 and a first lower cross-piece 58, each crosspiece attaching to and connecting the first and second counterweight assemblies 36, 40 (see FIG.

2), a second upper cross-piece 60 and a second lower cross-piece 62 (see FIG. 3), each of the second cross-pieces extending from the first counterweight assembly 36 towards, but not reaching the second counterweight assembly 40; a post 64 extending vertically from the cantilevered end portions 66 of said second upper cross-piece 60 and said second lower cross-piece 62; and a pair of mainstays 66, each mainstay extending from an upper cross-piece to a lower cross-piece at a median portion thereof (see FIGS. 2 and 3). Because the second upper cross piece 60, the second lower cross-piece 62, and the post 64 do not reach the second counterweight assembly 40, an opening 68 exists for receiving a secondary support, as will be discussed infra.

Each of the first and second upper cross-pieces 56, 60 and the first and second lower cross-pieces 58, 60, has a first guide roller 70 and a second guide roller 72 attached thereto. The first guide rollers 70 are attached to the cross-pieces adjacent the first counterweight assembly 36 and engage bus bar 74. The second guide rollers 72 are attached to the cross-pieces adjacent the second counterweight assembly and engage the secondary support 20 as will be discussed infra. Each guide roller is utilized to maintain an air gap between each primary element 68 and the secondary element 28.

Each primary element, as will be discussed infra, is affixed to a mainstay 68 by welding Each mainstay strengthens and stiffens each primary element against deflection due to magnetic and other dynamic loads. Deflection of the primary elements must be minimized to maintain air gaps between each primary element and the secondary element thereby minimizing the potential for interference therebetween. Each mainstay also transmits the loads and forces within the motor assembly to the housing 26. As a result, the housing (and the car 14 via ropes 16) may be driven upwardly and downwardly by operation of the motor.

The Primary Elements

Figure 6:
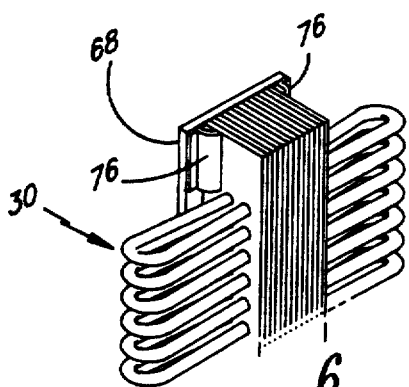
FIG. 6 is a perspective view of a portion of the linear motor of FIG. 1.

Each primary element of the motor is composed of a magnetic flux-carrying core material, such as steel in laminated form (shown as solid for ease of depiction in FIGS. 1-3), as is known in the art. The laminations are arranged vertically along the direction of travel of the linear motor. The laminations are compressed together by means of brackets 76 (see FIG. 6) and then welded to the mainstay 68 through the openings 77.

The Secondary Element

Figure 5:
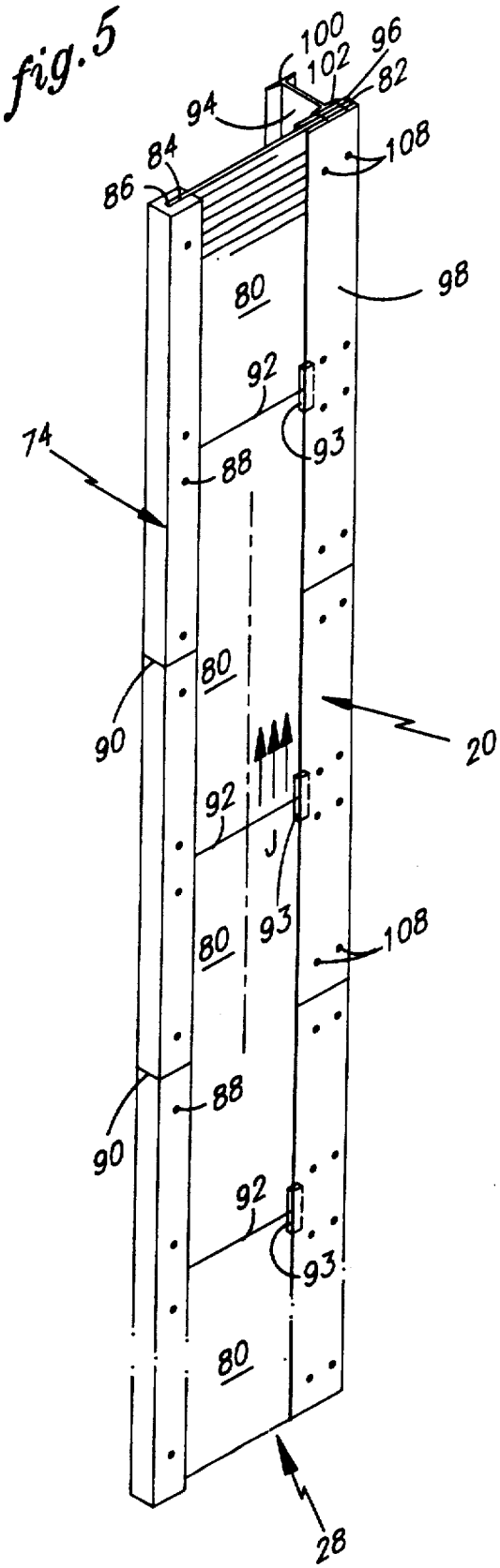
FIG. 5 is a perspective view of a portion of the linear motor of FIG. 1.

Referring to FIG. 5, the secondary element 28, which may be comprised of a conductive, non-magnetic, material such as aluminum, copper, an alloy thereof, or the like, is segmented into rectangular pieces 80 of manageable size and weight for ease of installation. Each secondary element has a first and second side corresponding to the first and second primary elements 30, 32. A first longitudinal edge portion 82 of each segment is supported by the secondary support 20 as will be discussed infra. A second longitudinal edge portion 84 of each segment is enclosed by a first bus bar 74.

The first bus bar 74, which is constructed of a non-magnetic, conductive material, such as aluminum, has an elongated slot 86 (see also FIGS. 2 and 3) for conductively receiving the second longitudinal edge portion 84 of each segment 80. The first bus bar is attached to the secondary element by means of conductive screws 88 or the like which may be countersunk or machined to be flush with the surface of the first bus bar to avoid damaging the first guide rollers 70 which travel thereon. As with the secondary element, the first bus bar is sectioned for ease of installation.

Joints 90 between adjacent sections of the first bus bar do not coincide with the joints 92 between adjacent segments of the secondary element 28 so that current induced in the secondary element may flow between adjacent segments of the secondary element. Joint 90 between adjacent sections of the first bus bar is not as critical as joint 92 between secondary element segments because current is free to flow along the secondary element at the first bus bar section joints.

The first bus bar 74 provides several advantages: a highly conductive surface is provided to conduct current between adjacent segments of the secondary element thereby increasing motor efficiency and minimizing losses; a wear surface is provided for the guide rollers 70 which maintain the air gap between the primary elements and the secondary element; and, structural rigidity is provided between adjacent segments of the secondary element.

Structural rigidity of the adjacent segments is particularly important in maintaining the required air gap between the second element and the primary elements. If the segments move relative to each other, the required air gap may not be maintained. By constructing the first bus bar and the segments of the secondary of aluminum, the overall weight of the secondary element is minimized. As a result, the weight of the support structure may be minimized thereby minimizing the structural weight supporting requirements of the hoistway.

A highly conductive second bus bar 93, having a rectangular shape, is disposed along the first and second sides of each secondary element 80 across the joint 92 therebetween. The second bus bars are disposed within the secondary support 20, as will be discussed infra. The second bus bars functions similarly to the first bus bar to conduct current across each joint as will be discussed infra.

The Secondary Support

The secondary support 20 is comprised of an I-beam 94, a rectangular first plate 96 and a rectangular second plate 98, all of which are segmented and extend along the length of the hoistway.

The I-beam has a first face 100, which attaches by conventional means to the hoistway, and a second face 102 which attaches to the first and second rectangular plates 96, 98 and each segment 80 of the secondary elements as follows. The first longitudinal edge portion 82 of each segment of the secondary element is sandwiched by the pair of plates 96, 98. A plurality of connectors 108, such as bolts or the like, extend through each plate, the secondary element 28 and the second face 102 of the I-beam to secure the parts to each other. As with the first bus bar 74, segments of the plates overlap the joints 92 between adjacent segments of the secondary elements to conduct current across the joints by means of the second bus bar 93.

Each plate 96, 98 has, at or near a mid-point thereof, a rectangular groove. The groove has a tight fit with each second bus bar 93 such that when the plates are coupled together by means of connectors 108, the second bus bar is securely held against adjacent secondary segments 80 to efficiently conduct current across the joint 92.

The plates and the I-beam are constructed of structural steel to adequately support the secondary element.

The first and second plate also provide a surface for the second guide rollers 72 which help maintain the air gap between the primary elements and the secondary element.

Operation

Figure 4:
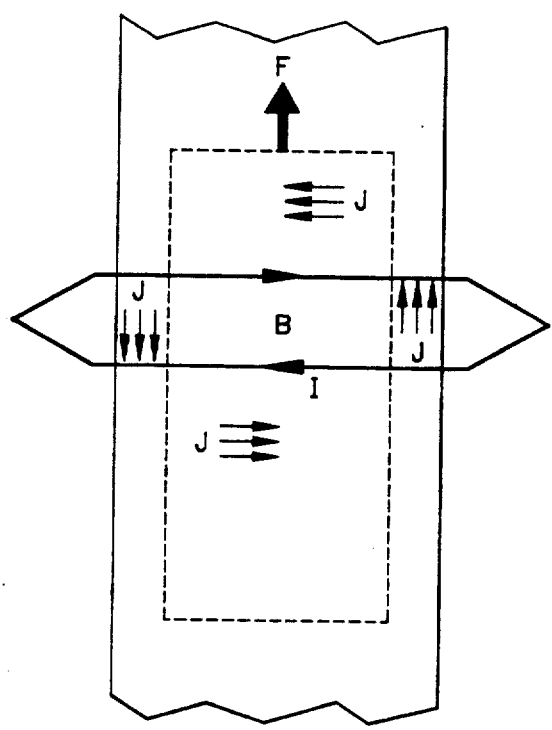
FIG. 4 is a schematic view of typical paths and locations for currents and forces as may be utilized by the linear motor of FIG. 1.

Referring to FIG. 4, three phase AC current (I) excites the coils, as is known in the art, thereby producing magnetic flux (B) between each primary elements and the secondary element and inducing current in the secondary element. The cross product of current density (J) and the magnetic flux density (B) provides motive force (F), as in a conventional AC induction motor, for moving the housing upwardly and downwardly (FIG. 3 demonstrates upward motion of the housing).

The guide rollers 70, 72 and the primary elements are configured such that the load due to the attractive forces of the primary elements is transmitted in a balanced, opposing manner to the secondary element. The first guide rollers 70 ride up and down the bus bar 74 and the guide rollers ride up and down the first and second plates 102, 104.

Although, the invention has been shown and described with respect to a best mode embodiment thereof, it should be understood by those of ordinary skill in the art, that various omission, changes and additions in the form and detail thereof may be made without departing from the spirit and scope of the invention.

We claim:

1. An elevator for use within a hoistway, said elevator comprising:
   a car,
   a linear motor comprising;
      a secondary assembly having:
         a support attaching to said hoistway and extending therefrom, and
         a flat secondary element comprised of a plurality of segments, each segment supported by a first edge thereof from said support, and
         a bus bar means attaching to a second edge of adjacent segments of said secondary elements for conducting current between adjacent segments of the secondary element, and
      a primary assembly separated from said secondary element by an air gap, and
   a rope attaching to said car and to said primary assembly, such that motion of said primary assembly induces concomitant motion of said car.

2. The elevator of claim 1 wherein said bus bar means comprises:
   a bar having a slot for receiving said second edge of said segments.

3. The elevator of claim 1 further comprising:
   guide means attaching to said primary assembly for separating said primary assembly from said secondary assembly to maintain an air gap therebetween, said guide means traveling along a length of said bus bar.

4. The elevator of claim 3 wherein said bus bar means comprises:
   a bar having a slot for receiving said second edge of said segments, said bar having a surface for guiding said guide means.

5. The elevator of claim 1 wherein said bus bar means further comprises:
   a plurality of segments having closely spaced joints therebetween said joints being offset from joints between said adjacent segments.

6. A motor for providing motive force to an elevator disposed within a hoistway, said motor comprising:
   a secondary assembly having;
      a support attaching to said hoistway and extending therefrom, and
      a flat secondary element comprised of a plurality of segments, each segment supported by a first edge thereof from said support, and
      a bus bar means attaching to a second edge of adjacent segments of said secondary elements for conducting current between adjacent segments of the secondary element, and
   a primary assembly separated from said secondary assembly by an air gap.

7. The motor of claim 6 wherein said bus bar means comprises:
   a bar having a slot for receiving said second edge of said segments.

8. The motor of claim 6 further comprising:
   guide means attaching to said primary assembly for separating said primary assembly from said secondary assembly to maintain an air gap therebetween, said guide means traveling along a length of said bus bar.

9. The motor of claim 8 wherein said bus bar means comprises:
   a bar having a slot for receiving said second edge of said segments, said bar having a surface for guiding said guide means.

10. The motor of claim 6 wherein said bus bar means further comprises:
    a plurality of segments having closely spaced joints therebetween said joints being offset from joints between said adjacent segments.

* * * * *